(12) United States Patent
Nagumo

(10) Patent No.: US 11,078,991 B2
(45) Date of Patent: Aug. 3, 2021

(54) PLANETARY GEAR DEVICE

(71) Applicant: SUMITOMO HEAVY INDUSTRIES, LTD., Tokyo (JP)

(72) Inventor: Toshiya Nagumo, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/521,048

(22) Filed: Jul. 24, 2019

(65) Prior Publication Data

US 2019/0346024 A1  Nov. 14, 2019

Related U.S. Application Data

(63) Continuation of application No. PCT/JP2018/003677, filed on Feb. 2, 2018.

(30) Foreign Application Priority Data

Feb. 10, 2017  (JP) .............................. JP2017-022937

(51) Int. Cl.
  *F16H 1/32*  (2006.01)
  *F16C 19/06*  (2006.01)
  (Continued)

(52) U.S. Cl.
  CPC .............. *F16H 1/32* (2013.01); *F16C 19/06* (2013.01); *F16C 19/26* (2013.01); *F16C 33/66* (2013.01); *F16H 55/08* (2013.01)

(58) Field of Classification Search
  CPC ...... F16H 1/32; F16H 2001/323; F16H 55/08; F16C 19/06; F16C 19/26; F16C 33/66
  See application file for complete search history.

(56) References Cited

U.S. PATENT DOCUMENTS 4,553,451 A   11/1985  Distin, Jr. et al.
4,604,916 A * 8/1986  Distin, Jr. ................ F16H 1/32
                                                   475/168

(Continued)

FOREIGN PATENT DOCUMENTS

DE   198 57 031 A1   6/1999
JP   S59-171248 U   11/1984
(Continued)

OTHER PUBLICATIONS

International Search Report issued in Application No. PCT/JP2018/003677, dated Mar. 13, 2018.
(Continued)

*Primary Examiner* — Huan Le
(74) *Attorney, Agent, or Firm* — Michael Best & Friedrich LLP

(57) ABSTRACT

A planetary gear device includes: a first internal gear and a second internal gear, a first external gear which meshes with the first internal gear, a second external gear which meshes with the second internal gear, and an eccentric body which circumferentially moves the first external gear and the second external gear. The first external gear and the second external gear each independently have external teeth and are connected to each other to integrally rotate with each other, the first internal gear and the second internal gear each independently have internal teeth, one of the first internal gear and the second internal gear is connected to a stationary side, and the other thereof is connected to an output side, and each of the first internal gear and the second internal gear has internal teeth which are constituted by a support body, and a rotating body rotatable to the support body.

14 Claims, 8 Drawing Sheets

(51) Int. Cl.
     *F16C 19/26*      (2006.01)
     *F16C 33/66*      (2006.01)
     *F16H 55/08*      (2006.01)

(56) References Cited

U.S. PATENT DOCUMENTS

| | | | | |
|---|---|---|---|---|
| 5,989,144 A | * | 11/1999 | Chen | F16H 1/32 |
| | | | | 475/168 |
| 6,231,469 B1 | | 5/2001 | Wang et al. | |
| 2011/0061974 A1 | * | 3/2011 | Satake | F16N 7/12 |
| | | | | 184/14 |

FOREIGN PATENT DOCUMENTS

| | | |
|---|---|---|
| JP | S61-136041 A | 6/1986 |
| JP | H11-173386 A | 6/1999 |
| JP | 2003-042165 A | 2/2003 |
| JP | 2008-184017 A | 8/2008 |
| JP | 2011-058600 A | 3/2011 |
| JP | 2012-202457 A | 10/2012 |
| JP | 2013-064450 A | 4/2013 |
| KR | 10-1699465 B1 | 1/2017 |
| WO | WO-2012/128003 A1 | 9/2012 |

OTHER PUBLICATIONS

Search Report issued in European Application No. 18750744.7, dated Jan. 22, 2020.

\* cited by examiner

FIG. 10

| No. | Zp1 | Zp2 | REDUCTION RATIO | RATIO WITH ONE LOWER REDUCTION RATIO |
|---|---|---|---|---|
| 1 | 13 | 6 | 13.000 | 1.077 |
| 2 | 12 | 6 | 14.000 | 1.100 |
| 3 | 11 | 6 | 15.400 | 1.126 |
| 4 | 13 | 7 | 17.333 | 1.010 |
| 5 | 10 | 6 | 17.500 | 1.097 |
| 6 | 12 | 7 | 19.200 | 1.094 |
| 7 | 9 | 6 | 21.000 | 1.048 |
| 8 | 11 | 7 | 22.000 | 1.064 |
| 9 | 13 | 8 | 23.400 | 1.140 |
| 10 | 10 | 7 | 26.667 | 1.013 |
| 11 | 12 | 8 | 27.000 | 1.037 |
| 12 | 8 | 6 | 28.000 | 1.161 |
| 13 | 13 | 9 | 32.500 | 1.015 |
| 14 | 11 | 8 | 33.000 | 1.091 |
| 15 | 9 | 7 | 36.000 | 1.111 |
| 16 | 12 | 9 | 40.000 | 1.125 |
| 17 | 10 | 8 | 45.000 | 1.059 |
| 18 | 13 | 10 | 47.667 | 1.028 |
| 19 | 7 | 6 | 49.000 | 1.122 |
| 20 | 11 | 9 | 55.000 | 1.164 |
| 21 | 8 | 7 | 64.000 | 1.031 |
| 22 | 12 | 10 | 66.000 | 1.182 |
| 23 | 13 | 11 | 78.000 | 1.038 |
| 24 | 9 | 8 | 81.000 | 1.235 |
| 25 | 10 | 9 | 100.000 | 1.210 |
| 26 | 11 | 10 | 121.000 | 1.190 |
| 27 | 12 | 11 | 144.000 | 1.174 |
| 28 | 13 | 12 | 169.000 | - |

PLANETARY GEAR DEVICE

RELATED APPLICATIONS

Priority is claimed to Japanese Patent Application No. 2017-022937, filed Feb. 10, 2017, and International Patent Application No. PCT/JP2018/003677, the entire content of each of which is incorporated herein by reference.

BACKGROUND

Technical Field

A certain embodiment of the present invention relates to a planetary gear device.

Description of Related Art

In the related art, a planetary gear device is known, which includes first and second external gears which are circumferentially moved by an eccentric body provided in an input shaft and first and second internal gears which individually mesh with the external gears.

The first and second external gears are planetary gears which are connected to each other and rotate integrally, the first internal gear is connected to a casing, and the second internal gear is fixed to an output shaft.

According to this configuration, a speed is reduced according to a gear ratio between the first external gear and the first internal gear and a gear ratio between the second external gear and the second internal gear, and a rotary motion is transmitted to the output shaft.

SUMMARY

According to an embodiment of the present invention, there is provided there is provided a planetary gear device including: a first internal gear and a second internal gear; a first external gear which meshes with the first internal gear; a second external gear which meshes with the second internal gear; and an eccentric body which circumferentially moves the first external gear and the second external gear, in which the first external gear and the second external gear each independently have external teeth and are connected to each other so as to integrally rotate with each other, the first internal gear and the second internal gear each independently have internal teeth, one of the first internal gear and the second internal gear is connected to a stationary side, and the other thereof is connected to an output side, and each of the first internal gear and the second internal gear has internal teeth which are constituted by a support body, and a rotating body rotatable to the support body.

BRIEF DESCRIPTION OF THE DRAWINGS

FIG. 10 is a table showing a relationship between an example of a combination of the number of teeth of the first external gear and the number of teeth of the second external gear and a reduction ratio thereof.

DETAILED DESCRIPTION

However, in a planetary gear device of the related art, an involute gear or the like is used for each gear, and thus, slippage is generated between teeth of an external gear and an internal gear meshing with each other, and there is a problem that transmission efficiency of power is easily reduced.

In addition, there is a problem that the teeth are worn by the slippage of the teeth.

It is desirable to provide a planetary gear device which effectively transmits power.

According to the present invention, in a planetary gear device, it is possible to improve transmission efficiency and reduce wear of teeth between an external gear and an internal gear.

Hereinafter, embodiments of the present invention will be described in detail with reference to the drawings.

[Outline of Speed Reducer]

Figure 1:
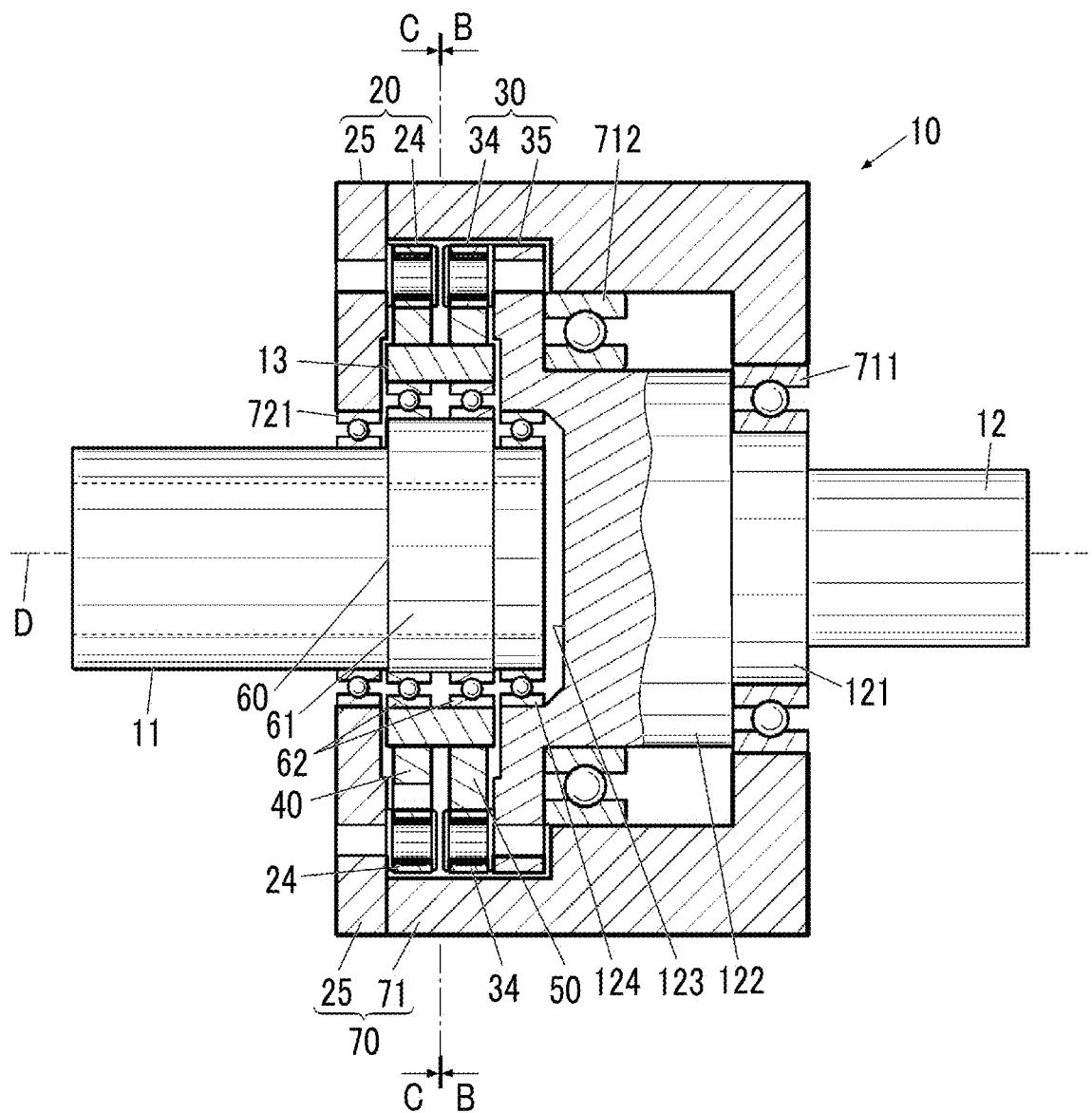
FIG. 1 is a longitudinal sectional view showing a planetary gear device according to an embodiment of the present invention.
Figure 2:
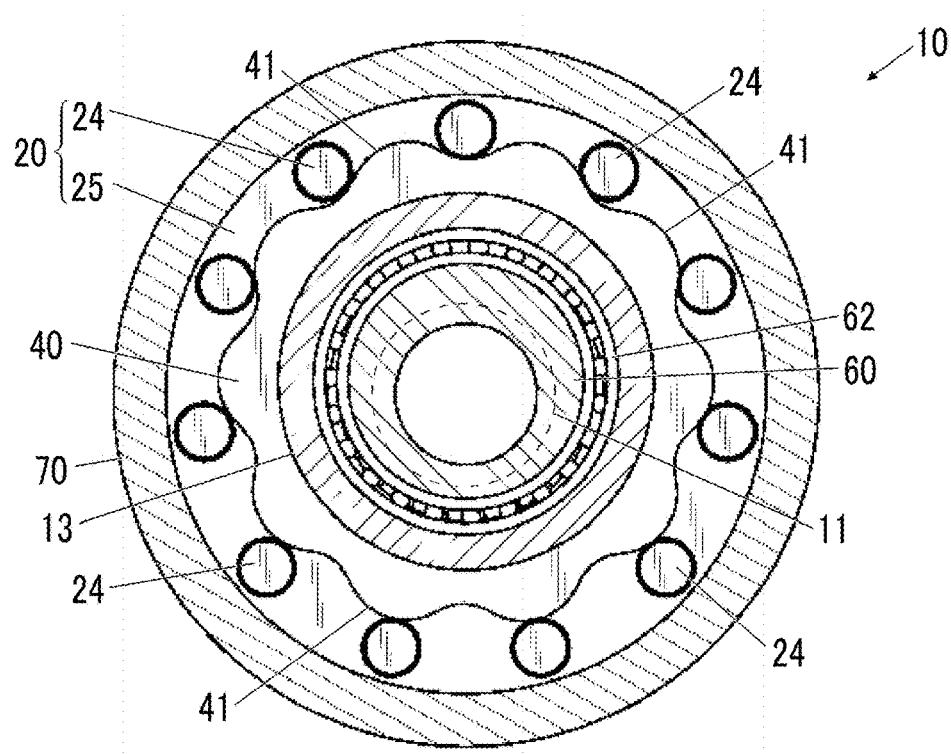
FIG. 2 is a sectional view when a cross section perpendicular to an axial direction of the planetary gear device of FIG. 1 is viewed in a direction of a reference symbol B.
Figure 3:
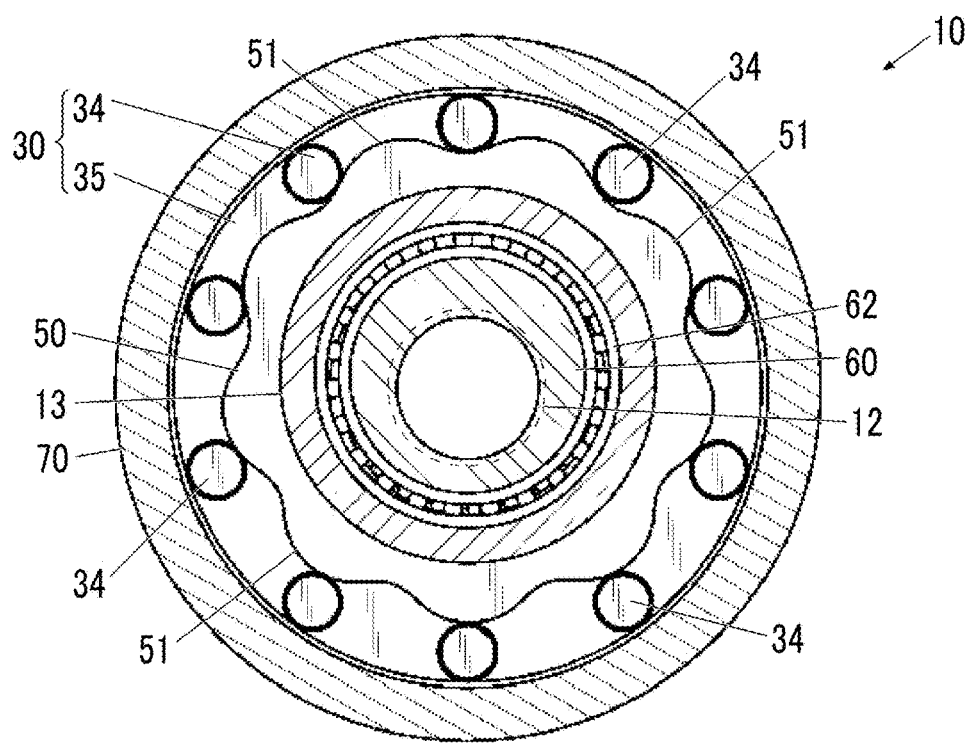
FIG. 3 is a sectional view when the cross section perpendicular to the axial direction of the planetary gear device of the FIG. 1 is viewed in a direction of a reference symbol C.

FIG. 1 is a longitudinal sectional view showing a speed reducer 10 which is a planetary gear device according to an embodiment of the present invention. FIG. 2 is a sectional view when a cross section perpendicular to an axial direction of the speed reducer 10 of FIG. 1 is viewed in a direction of a reference symbol B, and FIG. 3 is a sectional view when the same cross section is viewed in a direction of a reference symbol C. In addition, the "axial direction" indicates a direction parallel to a center axis D of each of an input shaft 11 and an output shaft 12 described later of the speed reducer 10.

Figure 4:
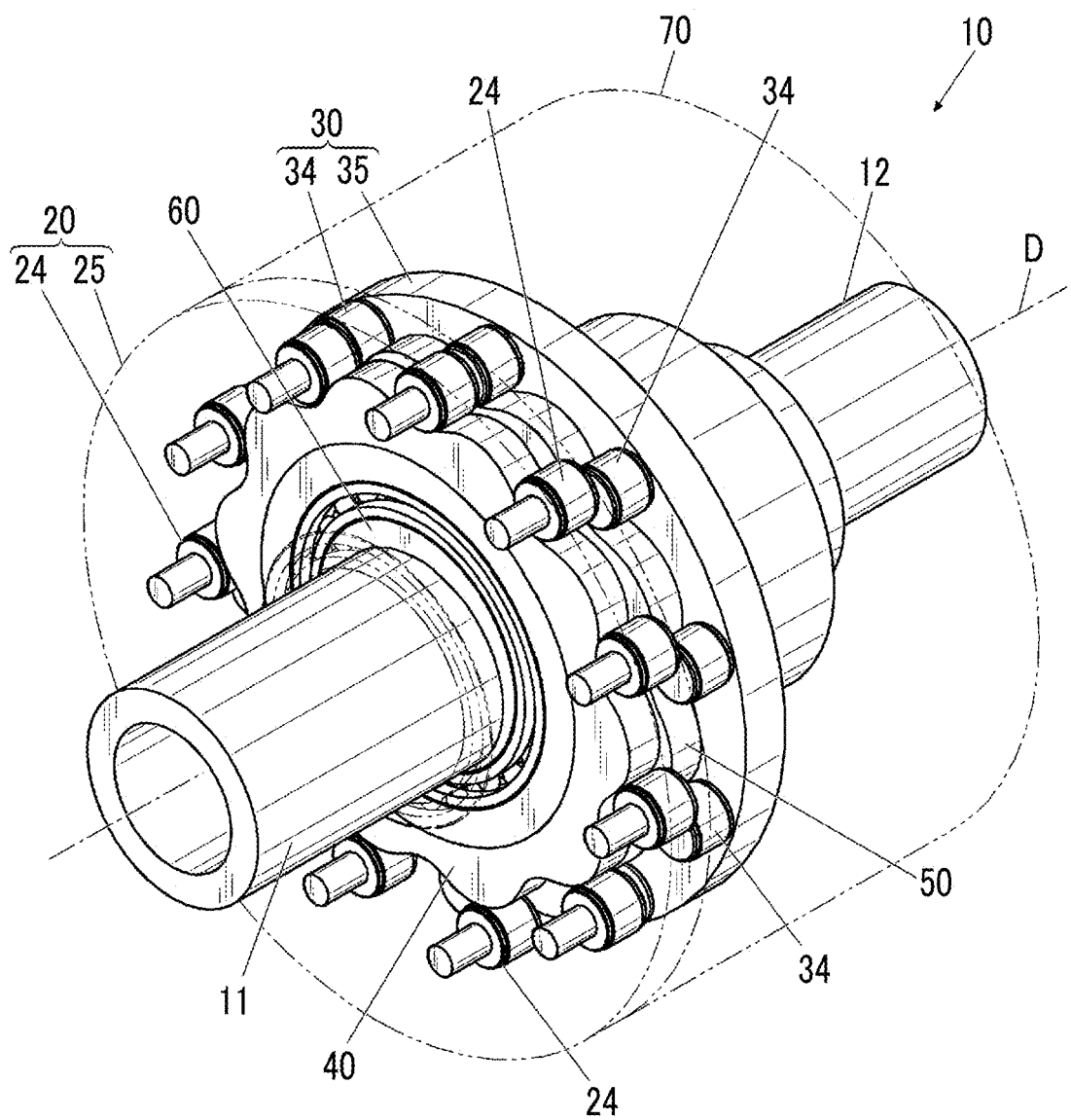
FIG. 4 is a perspective view of the planetary gear device in which some configurations are omitted.
Figure 5:
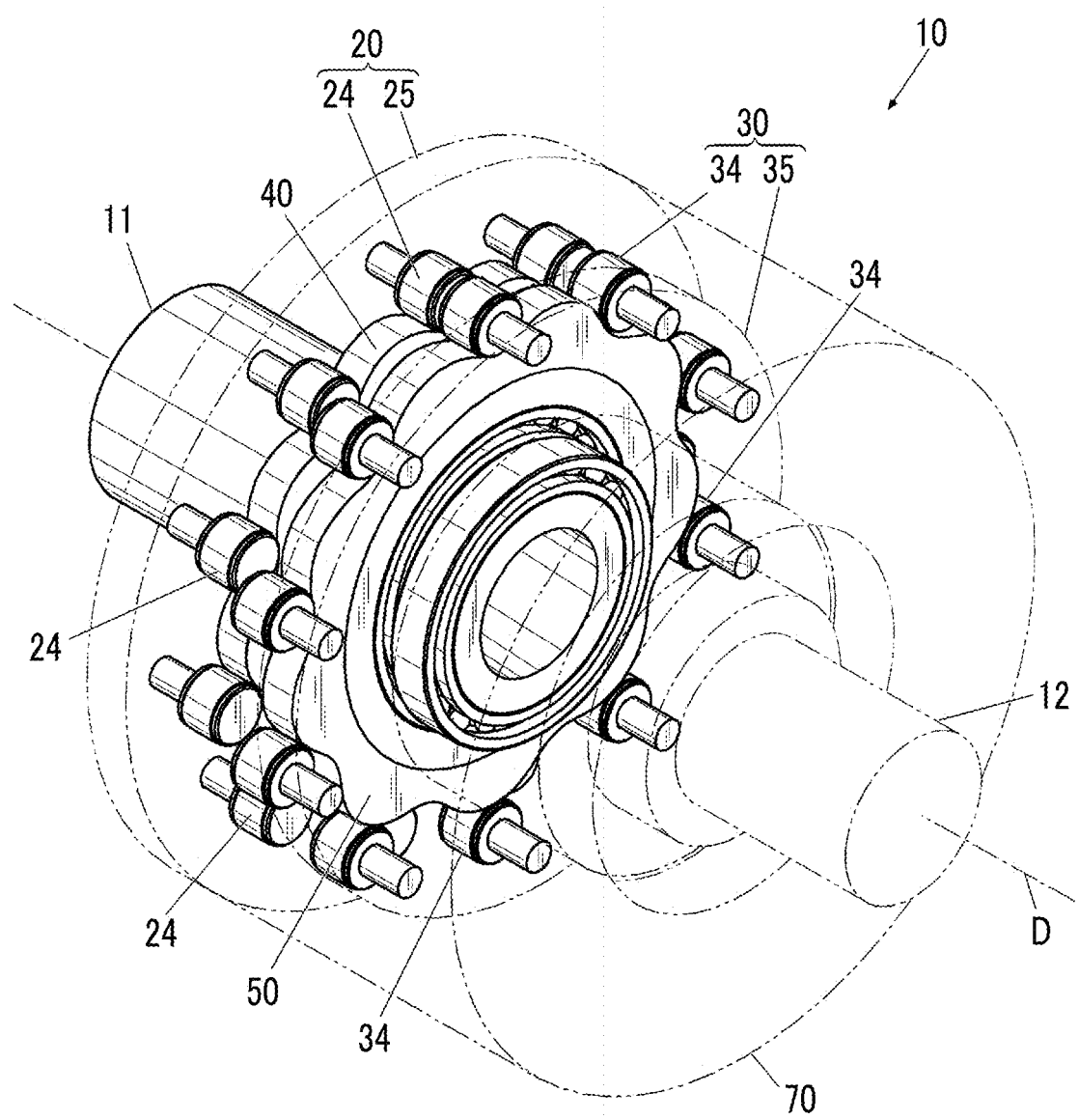
FIG. 5 is a perspective view when the planetary gear device in which some configurations are omitted is viewed in a direction different from that of FIG. 4.

In addition, FIGS. 4 and 5 are perspective views in which some configurations of the speed reducer 10 are omitted.

The speed reducer 10 transmits a rotary motion from the input shaft 11 to the output shaft 12 disposed coaxially, by a predetermined reduction ratio.

The speed reducer 10 includes a first internal gear 20, a second internal gear 30, a first external gear 40, a second external gear 50, an eccentric body 60, and a casing 70.

The first internal gear 20 and the second internal gear 30 are arranged in the axial direction of the input shaft 11, and the first internal gear 20, the second internal gear 30, and the input shaft 11 are coaxially disposed. The first external gear 40, the second external gear 50, a spacer 13, two bearings 62, the eccentric body 60, and the input shaft 11 are disposed in this order radially inside the internal gears 20 and 30.

In FIG. 4, the casing 70 is shown by two-dot chain lines, and in FIG. 5, the casing 70, a disk 35 (described later) of the second internal gear 30, and the output shaft 12 are shown by two-dot chain lines.

[Casing]

The casing 70 is an internal hollow container closed at both end portions and a cylindrical shape concentric with the input shaft 11 and the output shaft 12.

Each component of the speed reducer 10 is accommodated inside the casing 70 in a state where one end portion of the input shaft 11 and one end portion of the output shaft 12 individually protrude from a center portion of one end portion of the casing 70 and a center portion of the other end portion thereof to an outside.

As shown in FIG. 1, the casing 70 includes a body portion 71 whose one end portion is closed and a disk 25 which is a lid which closes an open end portion of the body portion 71.

A circular through-hole is formed in a center portion of the disk 25, and thus, the disk 25 rotatably supports the input shaft 11 via a bearing 721. In addition, this disk 25 is also a portion of the configuration of the first internal gear 20 and shares a member.

The body portion 71 has a cylindrical shape having the same outer diameter as that of the disk 25. A circular through-hole is formed at a center portion of a closed end portion of the body portion 71, and the body portion 71 rotatably supports the output shaft 12 via bearings 711 and 712.

Each of the bearings 711, 712, and 721 is a radial bearing, and more specifically, uses a deep groove ball bearing. However, if each of the bearings 711, 712, 721 is a radial bearing, another type of bearing may be used.

In addition, the body portion 71 and the disk 25 are integrally connected to each other by fastening members such as bolts or nuts (not shown).

[Input Shaft and Eccentric Body]

As shown in FIG. 1, the input shaft 11 is a hollow shaft and is rotatably supported by the disk 25 of the casing 70 and the output shaft 12 via the bearings 721 and 124.

One end portion of the input shaft 11 protrudes to the outside of the casing 70 and a rotation is input from the one end portion.

An eccentric body 60 is integrally formed with the input shaft 11 on an outer periphery of an end portion of the input shaft 11 disposed inside the casing 70.

A center axis of the eccentric body 60 is parallel to a center axis of the input shaft 11 and the eccentric body 60 is a cylindrical portion which is eccentric to the input shaft 11. That is, an outer peripheral surface 61 of the eccentric body 60 is eccentric to the center of the input shaft 11. An axis perpendicular cross-sectional shape of the outer peripheral surface 61 of the eccentric body 60 is a perfect circle.

The spacer 13 is mounted on the outer peripheral surface 61 of the eccentric body 60 via the two bearings 62 which are arranged in the axial direction. An axis perpendicular cross-sectional shape of the spacer 13 is a perfect circle. In addition, the first external gear 40 and the second external gear 50 are mounted on an outer periphery of the spacer 13 in a state of being arranged in the axial direction. Moreover, the first external gear 40 and the second external gear 50 are fixed to the spacer 13 by a fastening member such as a screw (not shown) and can be removed and replaced.

Each of the bearings 124 and 62 is a radial bearing, and more specifically, uses a deep groove ball bearing. However, if each of the bearings 124 and 62 is a radial bearing, another type of bearing may be used.

According to the above-described structure, if a rotation is input to the input shaft 11 and the eccentric body 60, the first and second external gears 40 and 50 circumferentially move with a circular trajectory whose radius is an eccentricity of the eccentric body 60, at an input rotational speed. In addition, the first external gear 40 and the second external gear 50 are integrally connected to each other and the gears 40 and 50 can rotate relative to the eccentric body 60 by the two bearings 62.

[Output Shaft]

As shown in FIG. 1, the output shaft 12 is rotatably supported by the casing 70 via the bearings 711 and 712 at a position concentric with the input shaft 11.

One end portion of the output shaft 12 protrudes to the outside of the casing 70, and a decelerated rotation is output from the one end portion. In addition, the other end portion of the output shaft 12 is integrally connected to a disk 35 of the second internal gear 30 described later.

In addition, a first enlarged diameter portion 121 and a second enlarged diameter portion 122 are formed on a portion of the output shaft 12 inside the casing 70, and thus, a diameter of the output shaft 12 is expanded in two steps toward the other end portion. In addition, the bearings 711 and 712 are individually positioned at corners formed at a boundary position between the first enlarged diameter portion 121 and the second enlarged diameter portion 122 and a boundary position between the second enlarged diameter portion 122 and the disk 35.

In addition, a circular recessed portion 123 is formed at a center portion of the end portion of the output shaft 12 on the disk 35 side. The above-described bearing 124 is provided on an inner peripheral surface of the recessed portion 123 and the output shaft 12 rotatably supports the input shaft 11.

[First External Gear]

As shown in FIG. 2, the first external gear 40 is a planetary gear which circumferentially moves about the input shaft 11 by the above-described eccentric body 60.

This first external gear 40 adopts an epitrochoid parallel curvilinear tooth profile.

External teeth 41 of the first external gear 40 mesh with internal teeth of the first internal gear 20. Each of the internal teeth described later of the first internal gear 20 is constituted by a roller member 21 of the rotating body 24.

Accordingly, each of the external teeth 41 of the first external gear 40 has an epitrochoid parallel curve shape, and thus, meshing between the first external gear 40 and the first internal gear 20 can be smoothly performed.

In addition, a total tooth length of the first external gear 40 is set to be approximately twice the eccentricity of the eccentric body 60 or to be slightly larger than approximately twice the eccentricity of the eccentric body 60.

As long as the number of teeth of the first external gear 40 is plural, the number of teeth is not limited. However, the number of teeth of each of the first and second internal gears 20 and 30 and the number of teeth of each of the first and second external gears 40 and 50 are parameters which determine the reduction ratio of the speed reducer 10, and thus, the number of teeth of the first external gear 40 is appropriately determined by a relationship between a target reduction ratio and the number of teeth of each of other gears 20, 30, and 50.

In addition, in FIG. 2, the number of teeth of the first external gear 40 is ten. However, this is an example, and the number of teeth can increase or decrease.

A relationship between the number of teeth of each of the internal gears 20 and 30 and the number of teeth of each of the external gears 40 and 50 will be described in detail later.

[Second External Gear]

As shown in FIG. 3, the second external gear 50 is a planetary gear which circumferentially moves about the input shaft 11 together with the first external gear 40 by the above-described eccentric body 60.

In addition, the second external gear 50 is fixedly mounted on the outer periphery of the spacer 13, and thus, the first external gear 40 and the second external gear 50 are concentrically connected to each other.

Accordingly, the first external gear 40 and the second external gear 50 integrally move circumferentially around the input shaft 11, and integrally rotate around a center axis of each of the gears 40 and 50 (eccentric body 60).

This second external gear 50 also adopts an epitrochoid parallel curvilinear tooth profile.

External teeth 51 of the second external gear 50 mesh with internal teeth of the second internal gear 30. Similarly to the first internal gear 20, the internal teeth of the second internal gear 30 described later is constituted by the roller member 31 of the rotating body 34.

In addition, a total tooth length of the second external gear 50 is set to be approximately twice the eccentricity of the eccentric body 60 or to be slightly larger than approximately twice the eccentricity of the eccentric body 60.

The number of teeth of the second external gear 50 is appropriately determined by a relationship between a target reduction ratio and the number of teeth of each of other gears 20, 30, and 40.

In addition, in FIG. 3, the number of teeth of the second external gear 50 is nine. However, this is an example, and the number of teeth can increase or decrease. Moreover, the numbers of teeth of the first external gear 40 and the second external gear 50 may be the same as or different from each other.

[First Internal Gear]

Figure 6:
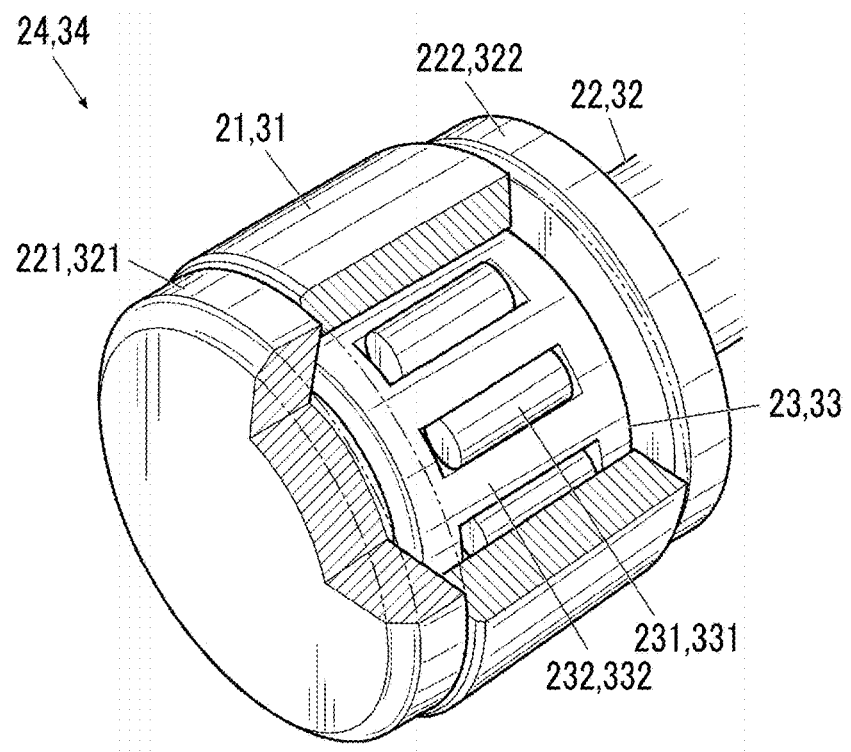
FIG. 6 is a perspective view of rotating bodies of first and second internal gears.

FIG. 6 is a perspective view in which the configuration of the rotating body 24 is partially cut out. The first internal gear 20 is an internal gear in which the plurality of roller members 21 are the internal teeth. As shown in FIG. 6, the first internal gear 20 includes the plurality of rotating bodies 24 having the roller member 21, a pin member 22, and a bearing 23, and the disk 25 which is a support body supporting each rotating body 24.

As described above, the disk 25 has a function as the lid of the casing 70 and is fixed to the body portion 71 of the casing 70.

The pin member 22 is a round bar having a perfect circular cross section including flanges 221 and 222 at one end portion and an intermediate portion in a longitudinal direction. In addition, the pin member 22 rotatably supports the roller member 21 via the bearing 23 between the flanges 221 and 222.

The pin member 22 is fixedly mounted on the disk 25 in parallel in the axial direction of the speed reducer 10. In addition, the pin member 22 is mounted on the disk 25 in a state where a support end portion side of the roller member 21 protrudes to an inner side of the casing 70.

The roller member 21 is a cylindrical body and rotates about the pin member 22.

The bearing 23 is interposed between the pin member 22 and the roller member 21. As the bearing 23, a radial bearing, more specifically, a needle roller bearing is used. However, other types of radial bearings such as a ball bearing and a roller bearing may be used if a space is permitted.

In addition, as shown in FIG. 6, the bearing 23 includes a plurality of needle rollers 231 as rolling elements and a holder 232 in which the needle rollers 231 are disposed at uniform intervals. That is, the bearing 23 has functions of an outer ring and an inner ring with respect to the roller member 21 and the pin member 22. However, a bearing having an inner ring and an outer ring which are independent of the roller member 21 and the pin member 22 may be used.

As shown in FIG. 2, the disk 25 is concentric with the input shaft 11. In addition, the plurality of rotating bodies 24 are disposed on an inner surface of the disk 25 at uniform angular intervals such that a rotation center of the roller member 21 is positioned on a circumference positioned at a uniform distance from the center axis D of the input shaft 11.

Accordingly, the first internal gear 20 constitutes the internal gear in which the roller members 21 function as the internal teeth and a gap between the roller member 21 and the roller member 21 function as a tooth space.

In addition, as described above, the disk 25 is fixed to the casing 70, and thus, the disk 25 does not rotate regardless of the rotation of the input shaft 11.

As described above, the first external gear 40 is disposed inside the respective roller members 21 which are arranged on the circumference. In addition, one or the plurality of external teeth 41 around a position, at which the eccentricity of the first external gear 40 is maximized by the circumferential movement of the eccentric body 60, mesh with the roller member 21 of the first internal gear 20. Moreover, one or the plurality of external teeth 41 around a position, at which the eccentricity of the first external gear 40 is minimized by the circumferential movement of the eccentric body 60, do not mesh with the roller member 21 of the first internal gear 20.

These are realized by appropriately selecting the eccentricity of the eccentric body 60, a radius of the circumference for disposing the roller member 21 of the first internal gear 20, a radius of the roller member 21, an epitrochoid parallel curve constituting the external teeth 41 of the first external gear 40, or the like.

In addition, since the first external gear 40 internally meshes with the first internal gear 20, the number of roller members 21 (internal teeth) of the first internal gear 20 is larger than the number of external teeth 41 of the first external gear 40.

In FIG. 2, the number of teeth of the first internal gear 20 is 11. However, this is example and the number of teeth of the first internal gear 20 can increase or decrease.

[Second Internal Gear]

The second internal gear 30 is an internal gear in which the plurality of roller members 31 are the internal teeth. As shown in FIG. 6, the second internal gear 30 includes the plurality of rotating bodies 34 having the roller member 31, a pin member 32 having flanges 321 and 322, and a bearing 33 having rolling elements (needle rollers 331) and a holder 332, and the disk 35 which is a support body supporting each rotating body 34.

As described above, the disk 35 is integrally connected to the other end portion of the output shaft 12.

In addition, the rotating body 34 has the same structure (dimensions such as an outer diameter of the roller member 31 may be different) as that of the above-described rotating body 24, and thus, in FIG. 6, a reference symbol of each portion of the rotating body 34 is shown together with the reference symbol of each portion of the rotating body 24, and detail descriptions of the configuration will be omitted.

As shown in FIG. 3, the disk 35 is concentric with the output shaft 12. In addition, the plurality of rotating bodies 34 are disposed on an inner surface of the disk 35 at uniform angular intervals such that a rotation center of the roller member 31 is positioned on a circumference positioned at a uniform distance from the center axis D of the output shaft 12.

Accordingly, the second internal gear 30 constitutes the internal gear in which the roller members 31 function as the internal teeth and a gap between the roller member 31 and the roller member 31 function as a tooth space.

In addition, as described above, the disk 35 is integrally connected to the output shaft 12, and thus, the second internal gear 30 and the output shaft 12 rotate at the same rotation angle and the same rotational speed.

The second external gear 50 is disposed inside the respective roller members 31 which are arranged on the circumference. In addition, one or the plurality of external teeth 51 around a position, at which the eccentricity of the second external gear 50 is maximized by the circumferential movement of the eccentric body 60, mesh with the roller member 31 of the second internal gear 30. Moreover, one or the plurality of external teeth 51 around a position, at which the eccentricity of the second external gear 50 is minimized by the circumferential movement of the eccentric body 60, do not mesh with the roller member 31 of the second internal gear 30.

These are realized by appropriately selecting the eccentricity of the eccentric body 60, a radius of the circumference for disposing the roller member 31 of the second internal gear 30, a radius of the roller member 31, an epitrochoid parallel curve constituting the external teeth 51 of the second external gear 50, or the like.

In addition, since the second external gear 50 internally meshes with the second internal gear 30, the number of roller members 31 (internal teeth) of the second internal gear 30 is larger than the number of external teeth 51 of the second external gear 50.

In FIG. 3, the number of teeth of the second internal gear 30 is 10. However, this is example and the number of teeth of the second internal gear 30 can increase or decrease.

[Lubrication of Each Bearing]

Figure 7:
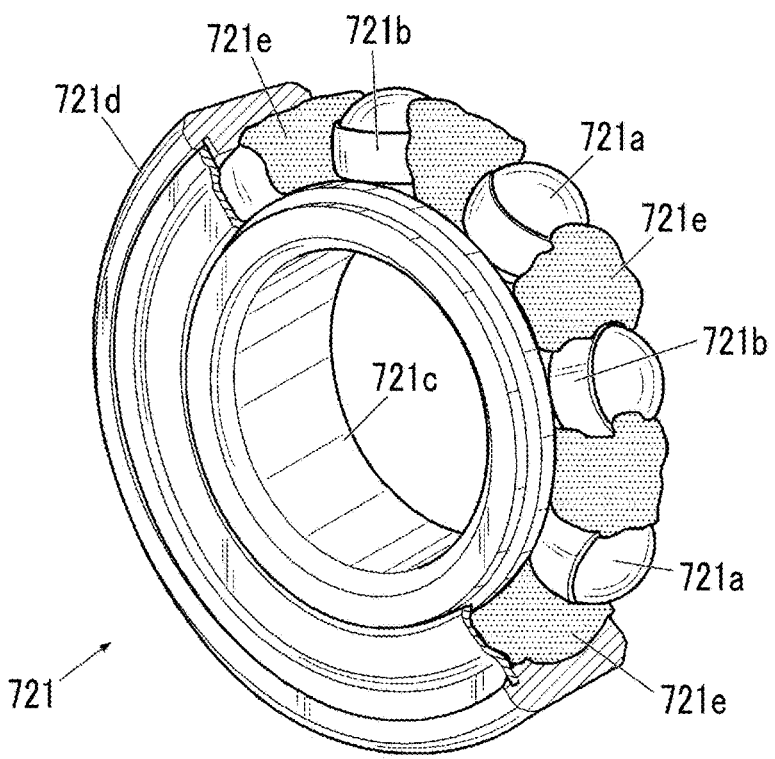
FIG. 7 is a perspective view in which a portion of a bearing which is lubricated by a thermally solidified grease is cut out.

In the speed reducer 10, each of the bearings 62, 124, 711, 712, and 721 used in each portion is lubricated by a structure shown in FIG. 7. Moreover, in FIG. 7, the bearing 721 is exemplified. However, each of other bearings 62, 124, 711, and 712 has the same lubrication structure.

In the bearing 721, a plurality of balls 721a which are rolling elements are disposed at fixed intervals by holders 721b between an inner ring 721c and an outer ring 721d. In addition, thermally solidified grease 721e is disposed between the balls 721a.

The thermally solidified grease 721e is a material obtained by adding a heat treatment and a cooling treatment to a material including a general lubricating grease and an ultrahigh molecular weight polyethylene and solidifying the material. A sealing state is realized by a resin obtained by solidifying the grease, and thus, stirring loss at the time of rotation is reduced while the grease is gradually supplied so as to maintain lubricity, and contamination due to leakage of the grease to the outside can also be reduced.

The lubrication structure using the thermally solidified grease can be used in the bearings 23 and 33 of the rotating bodies 24 and 34 of the first internal gear 20 and the second internal gear 30. In this case, it is preferable that the thermally solidified grease is disposed between the plurality of needle rollers 231 and 331 and the holders 232 and 332.

In addition, instead of the lubrication structure using the thermally solidified grease, a seal bearing, in which a lubricant such as lubricating oil or grease is supplied around a ball and a seal is provided between an inner ring and an outer ring to seal the lubricant internally, may be applied to the bearings 62, 124, 711, 712, 721, 23 and 33. Also in this case, the leakage of the lubricant can be reduced, and good lubrication can be achieved.

In addition, it is preferable that the lubrication structure using the thermally solidified grease or the seal bearing of sealing the lubricant is applied to all the bearings 62, 124, 711, 712, 721, 23, and 33, but may be applied to only some bearings. For example, the lubrication structure using the thermally solidified grease or the seal bearing of sealing the lubricant may be applied to only some bearings with a greater for lubrication in a high-speed rotation portion such as the bearings 62, 124, and 721 supporting the rotation of the input shaft 11.

[Lubrication of Rotating Body]

Figure 8:
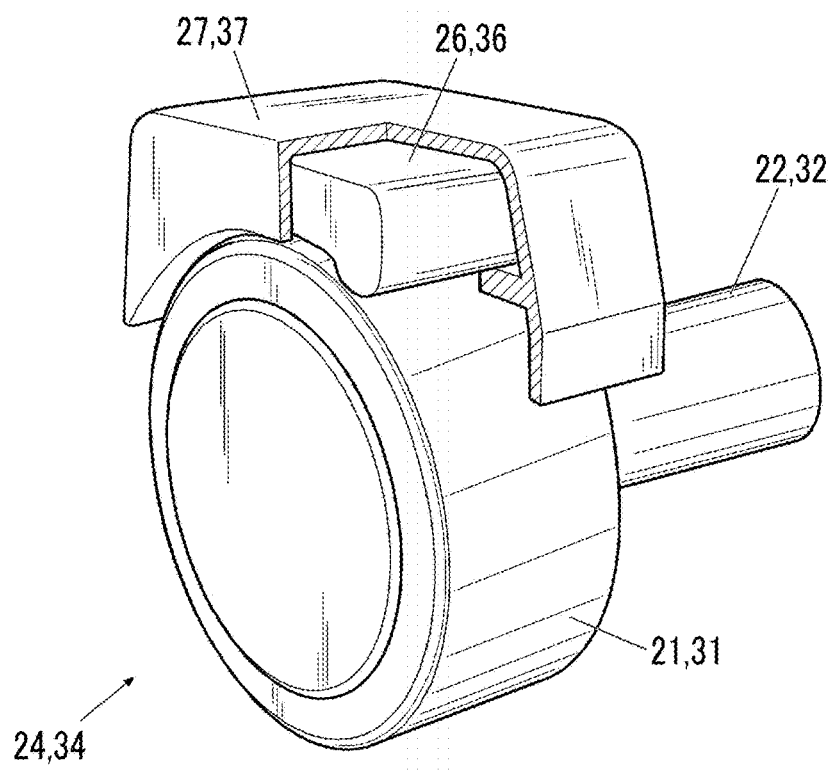
FIG. 8 is a perspective view showing a lubrication structure of the rotating body which is partially cut out.

The rotating bodies 24 and 34 of the first internal gear 20 and the second internal gear 30 mesh with the external teeth 41 and 51 of the first external gear 40 and the second external gear 50, respectively, and thus, in order to obtain durability of the roller members 21 and 31, a lubrication structure shown in FIG. 8 is provided.

The lubrication structure of the rotating body includes lubricant holding members 26 and 36 which slide on radially outer portions of the first internal gear 20 and the second internal gear 30 on the outer peripheral surfaces of the roller members 21 and 31, and support frame bodies 27 and 37 which support the holding members 26 and 36.

Each of the lubricant holding members 26 and 36 is a porous resin material impregnated with a lubricant such as lubricating oil or grease. In addition, the holding members 26 and 36 slide on the roller members 21 and 31, and thus, the retained lubricant can be gradually exuded and supplied to the roller members 21 and 31.

The lubricant is gradually exuded, and thus, the leakage thereof to the outside can be reduced, and good lubrication of the roller members 21 and 31 can be achieved.

[Reduction Ratio of Speed Reducer]

Figure 9:
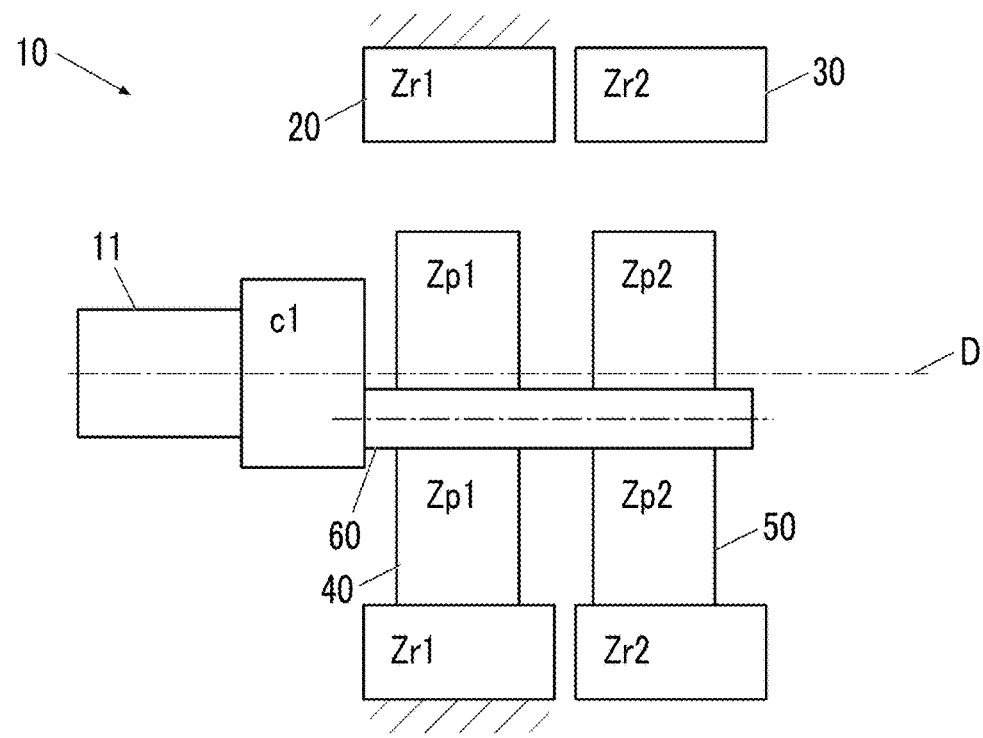
FIG. 9 is a schematic diagram schematically showing each configuration which transmits power from an input shaft of the planetary gear device to an output shaft thereof.

FIG. 9 is a schematic diagram schematically showing each configuration which transmits power from the input shaft 11 of the speed reducer 10 to the output shaft 12 thereof, and FIG. 10 is a table showing a relationship between an example of a combination of the number of teeth of the first external gear 40 and the number of teeth of the second external gear 50 and a reduction ratio thereof. In addition, in FIG. 9, the output shaft 12 is not shown.

In the following descriptions, the number of teeth of the first internal gear 20 is indicated by $Zr1$, the number of teeth of the second internal gear 30 is indicated by $Zr2$, the number of teeth of the first external gear 40 is indicated by $Zp1$, the number of teeth of the second external gear 50 is indicated by $Zp2$, and these are all natural numbers. In addition, a tooth number difference between the first internal gear 20 and the first external gear 40 is indicated by $S1$ ($=Zr1-Zp1$), and a tooth number difference between the second internal gear 30 and the second external gear 50 is indicated by $S2$ ($=Zr2-Zp2$).

Moreover, a rotational speed of the input shaft 11 is indicated by $Nc1$, a rotational speed of the first internal gear 20 is indicated by $Nr1$, a rotational speed of the second internal gear 30 is indicated by $Nr2$, a rotational speed of the first external gear 40 is indicated by $Np1$, and a rotational speed of the second external gear 50 is indicated by $Np2$.

In addition, for convenience of explanation, a rotation in the clockwise direction viewed from the output shaft 12 side is referred to as a forward direction, and a rotation in the counter-clockwise direction is referred to as a backward direction.

If the input shaft 11 rotates once in the forward direction, the first external gear 40 circumferentially moves by one rotation in the forward direction about the center axis D. In this case, the first internal gear 20 meshing with the first external gear 40 is fixed to the casing 70, and thus, the first external gear 40 rotates. That is, a maximum eccentric position of the eccentric body 60 rotates once in the forward direction, each of the external teeth 41 of the first external gear 40 meshes with the internal teeth of the first internal gear 20 sequentially, and thus, the first external gear 40 rotates in the backward direction by the tooth number difference S1. That is, the first external gear 40 rotates (S1/Zp1) in the backward direction.

Meanwhile, in a case where the second external gear 50 does not rotate and circumferentially moves by one rotation in the forward direction, the second internal gear 30 rotates by the tooth number difference S2 in the forward direction. That is, the second external gear 50 rotates (S2/Zr2) in the forward direction.

However, in actual, since the second external gear 50 is connected to the first external gear 40, the second external gear 50 rotates (S1/Zp1) in the backward direction. Accordingly, the rotation in the backward direction is applied to the second internal gear 30 from the second external gear 50 by (Zp2/Zr2)*(S1/Zp1) obtained by multiplying (S1/Zp1) by a transmission ratio (Zp2/Zr2) from the second external gear 50.

Accordingly, if the input shaft 11 rotates once, a rotation in the forward direction of (S2/Zr2)−(Zp2/Zr2)*(S1/Zp1) is transmitted to the second internal gear 30. A rotational speed of the second internal gear 30 coincides with a rotational speed of the output shaft 12. In addition, the rotational speed of the output shaft 12 with respect to one rotation of the input shaft 11 coincides with a reduction ratio Nr2/Nc1 of the speed reducer 10, and thus, the reduction ratio Nr2/Nc1 can be expressed by the following Expression (1).

$$Nr2/Nc1 = (S2/Zr2) - (Zp2/Zr2)*(S1/Zp1) = \qquad (1)$$
$$(Zp1*S2 - Zp2*S1)/(Zp1*Zr2) =$$
$$(Zp1*S2 - Zp2*S1)/[Zp1*(Zp2+S2)]$$

Each of the external gears 40 and 50 and each of the internal gears 20 and 30 internally mesh with each other, and thus, each of the tooth number differences S1 and S2 is an integer of at least one or more. As a configuration of a basic number of teeth, if a case of S1=S2=1 is considered, the reduction ratio Nr2/Nc1 becomes the following Expression (2).

$$Nr2/Nc1=(Zp1*S2-Zp2*S1)/[Zp1*(Zp2+S2)]=(Zp1-Zp2)/[Zp1*(Zp2+1)] \qquad (2)$$

In Expression (2), in the case of Zp1=Zp2+1, the value of the reduction ratio Nr2/Nc1 is minimized (a ratio to decrease to the maximum) (following Expression (3)).

$$Nr2/Nc1=(Zp1-Zp2)/[Zp1*(Zp2+1)]=1/Zp1^2 \qquad (3)$$

For example, the number of teeth Zp1 of the first external gear 40 is set to 32 under the condition of Expression (3), the reduction ratio Nr2/Nc1=1/1024 can be obtained.

FIG. 10 shows a reduction ratio in each combination in a case where the number of teeth Zp1 of the first external gear 40 is selected in a range of 7 to 13 and the number of teeth of the second external gear 50 is selected in a range of 6 to 12 under conditions of S1=S2=1 and Zp1>Zp2. In addition, a rightmost column indicates a ratio with the reduction ratio of the next combination in a top and bottom order.

As shown in FIG. 10, under the conditions of S1=S2=1 and Zp1>Zp2, for each of the first external gear 40 and the second external gear 50 which are the planetary gears, in a case where different types of gears having different numbers of teeth are prepared, it is possible to realize a large number of reduction ratios with a small number. Specifically, in a case where seven types of first external gears 40 and seven types of second external gears 50 are prepared, 28 reduction ratios can be realized.

In addition, as shown in Expression (3) and FIG. 10, compared to the number of teeth of the first and second internal gears 20 and 30 and the first and second external gears 40 and 50, in the speed reducer 10, a more greatly decelerated reduction ratio can be obtained.

[Technical Effect of Speed Reducer]

In the speed reducer 10, both the first internal gear 20 and the second internal gear 30 have the disks 25 and 35 which the support bodies, and the rotating bodies 24 and 34 rotatable relative to the disks 25 and 35, respectively. In addition, the rotating bodies 24 and 34 function as the internal teeth and mesh with the external teeth 41 and 51 of the first external gear 40 and the second external gear 50.

Accordingly, when the first and second internal gears 20 and 30 and the first and second external gears 40 and 50 mesh with each other, the rotating bodies 24 and 34 of the first and second internal gears 20 and 30 prevent sliding of a tooth surface by the rotation, and it is possible to reduce a friction loss and realize highly efficient power transmission.

Moreover, the sliding of the tooth surface is suppressed, and thus, it is possible to reduce wear and to improve the durability of the first and second external gears 40 and 50.

Moreover, the respective rotating bodies 24 and 34 have the bearings 23 and 33 having rolling elements (needle rollers 231 and 331) disposed between the pin members 22 and 32 and the roller members 21 and 31, and thus, the sliding caused inside the roller members 21 and 31 is reduced, and it is possible to reduce a friction loss and realize highly efficient power transmission.

In addition, the internal wear of the rotating bodies 24 and 34 is reduced, and thus, it possible to improve the durability of the rotating bodies 24 and 34.

In addition, in the speed reducer 10, the first external gear 40 and the second external gear 50 are connected to each other and integrally rotates with each other, the first internal gear 20 is fixed to the casing 70, and the second internal gear 30 is connected to the output shaft 12.

In the speed reducer 10, according to a combination of the gear ratio between the first internal gear 20 and the first external gear 40 and the gear ratio between the second internal gear 30 and the second external gear 50, it is possible to realize various reduction ratios.

The first internal gear 20 and the first external gear 40 can be replaced with a plurality of sets having different gear ratios. In addition, the same applies to the second internal gear 30 and the second external gear 50.

Accordingly, for example, by preparing a plurality of sets having different gear ratios for one or both of the set of first internal gear 20 and first external gear 40 and the set of second internal gear 30 and second external gear 50, and exchanging these in set units, it is possible to provide the speed reducer 10 capable of selecting various reduction ratios.

In addition, the dimensions and the structures of the first external gear 40 and the second external gear 50 may be standardized, and the dimensions and the structures of the disk 25 of the first internal gear 20 and the disk 35 of the second internal gear 30 may be standardized. Accordingly, it possible to share the set of first internal gear 20 and first external gear 40 and the set of second internal gear 30 and second external gear 50, and thus, it is possible to select various reduction ratios with a smaller number of sets.

In addition, in this case, it is necessary to configure the second internal gear 30 separately from the output shaft 12 so as to allow connection and separation.

In addition, as described in Expression (1), in the speed reducer 10, it is possible to obtain the reduction ratio including a product of the number of teeth of the first external gear 40 and the number of teeth of the second external gear 50 in the denominator, and thus, compared to the numbers of teeth of the gears 20, 30, 40, and 50, it is possible to realize a reduction ratio which is greatly reduced.

For example, as described in Japanese Unexamined Patent Publication No. 2015-183780, in a speed reducer using an inscribed planetary gear device of the related art, only a reduction ratio including the number of teeth of a single gear in the denominator can be obtained, and thus, for example, in order to obtain a reduction ratio of 1/100, a planetary gear having the number of teeth of nearly 100 is needed. Meanwhile, in the speed reducer 10, as shown in FIG. 10, for example, in the smallest case, the number of teeth of the first external gear 40 can be reduced to 10, and the number of teeth of the second external gear 50 can be decreased to 9. Accordingly, it is possible to dramatically reduce the numbers of teeth of the external gears 40 and 50.

Therefore, according to the reduction of the number of teeth, it possible to easily and accurately process the first external gear 40 and the second external gear 50 having curved external teeth.

In addition, according to the reduction of the number of teeth, it is possible to reduce the numbers of the rotating bodies 24 and 34 of the first internal gear 20 and the second internal gear 30, it is possible to improve accuracy of attachment, and it is possible to reduce a manufacturing cost by reducing the number of parts.

In addition, in the speed reducer 10, the thermally solidified grease is disposed between the rolling elements for all or some of the bearings 62, 124, 711, 712, 721, 23, and 33, and thus, it is possible to reduce the stirring loss at the time of the rotation while maintaining high durability of each portion, and it is possible to realize high efficient power transmission. In addition, contamination due to the leakage of the grease to the outside can be reduced.

Moreover, even in the case where the seal bearing sealing the lubricant is used for all or some of the bearings 62, 124, 711, 712, 721, 23, and 33, it is possible to perform a smooth rotation while maintaining high durability of each portion, and contamination due to the leakage of the lubricant to the outside can be reduced.

In addition, in the rotating bodies 24 and 34, the holding members 26 and 36 which holds the lubricant in an exuding manner are provided in a state of being in contact with the roller members 21 and 31. Accordingly, it is possible to perform good lubrication on the roller members 21 and 31 while reducing the leakage of the lubricant to the outside of the device. Accordingly, when the first external gear 40 and the second external gear 50 mesh with each other, it is possible to prevent wear of the external teeth of both the roller members 21 and 31, and the first and second external gears 40 and 50, and thus, it is possible to improve durability thereof.

[Other Examples of Rotating Body]

The structure is exemplified, in which the rotating bodies 24 and 34 of the first internal gear 20 and the second internal gear 30 rotatably support the roller members 21 and 31 by the bearings 23 and 33. However, the present invention is not limited to this.

Figure 11:
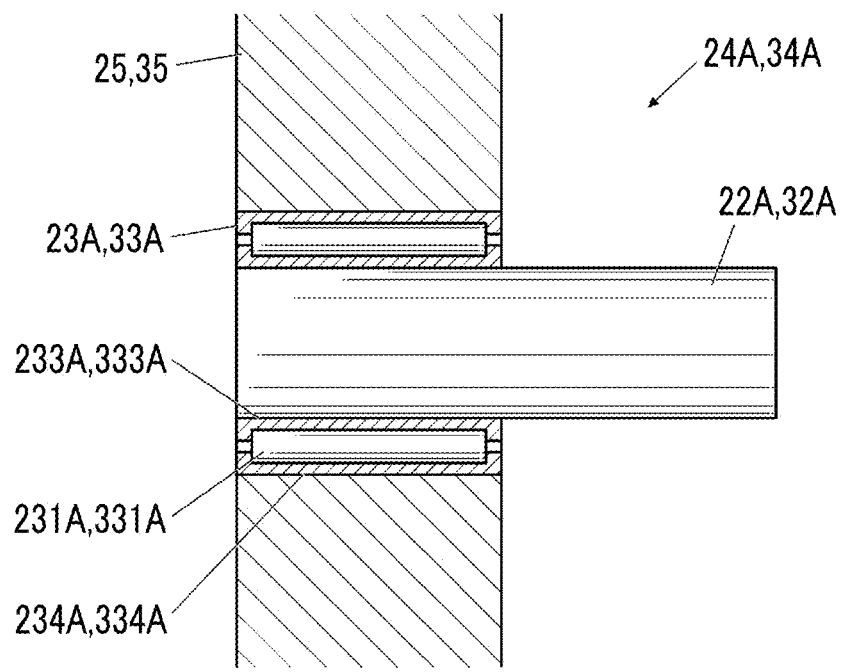
FIG. 11 is a sectional view showing another example of the rotating body.

For example, as shown in FIG. 11, as rotating bodies 24A and 34A, round bar-shaped pin members 22A and 32A may be provided in the disks 25 and 35, which are support bodies, via bearings 23A and 33A.

The bearings 23A and 33A include inner rings 233A and 333A, outer rings 234A and 334A, needle rollers 231A and 331A, and a holder (not shown). However, like the above-described bearings 23 and 33, the bearing which does not have the inner ring and the outer ring may be used.

Also in a case where the first and second internal gears 20 and 30 include the rotating bodies 24A and 34A, when the first and second external gears 40 and 50 mesh with each other, the pin members 22A and 32A smoothly rotate, the sliding of the tooth surfaces of the first and second external gears 40 and 50 is suppressed, the friction loss is reduced, and it is possible to achieve high efficient power transmission.

In addition, wear is reduced, and thus, it is possible to improve durability of the first and second external gears 40 and 50.

In addition, the internal wear of the rotating bodies 24A and 34A is reduced, and thus, it possible to improve the durability of the rotating bodies 24A and 34A.

In addition, in the bearings 23A and 33A, it is preferable that the thermally solidified grease shown in FIG. 7 is disposed between the plurality of needle rollers 231A and 331A. Alternatively, as the bearings 23A and 33A, a seal bearing which seals an inner lubricant may be used.

In addition, preferably, the lubricant holding member (refer to FIG. 8), which slides on the radially outer portions of the first internal gear 20 and the second internal gear 30 on the outer peripheral surfaces of the pin members 22A and 32A, is provided in the first internal gear 20 and the second internal gear 30.

[Others]

In the speed reducer 10, the first internal gear 20 is fixed to the casing 70, and the second internal gear 30 is connected to the output shaft 12. However, the present invention is not limited to this.

For example, the second internal gear 30 may be fixed to the casing 70 so as to extract an output rotation from the first internal gear 20.

In addition, the case where the planetary gear device is applied to the speed reducer is exemplified. However, this case is only an example, and the planetary gear device can be applied to other power transmission devices.

It should be understood that the invention is not limited to the above-described embodiment, but may be modified into various forms on the basis of the spirit of the invention. Additionally, the modifications are included in the scope of the invention.

The planetary gear device according to the present invention has industrial applicability to a planetary gear device which requires efficient power transmission.

What is claimed is:

1. A planetary gear device comprising:
a first internal gear and a second internal gear;
external gears comprising:
   a first external gear which meshes with the first internal gear;
   a second external gear which meshes with the second internal gear; and an eccentric body which circumferentially moves the first external gear and the second external gear, wherein the first external gear and the second external gear each independently have external teeth and are connected to each other so as to integrally rotate with each other, wherein each of the first internal gear and the second internal gear comprises a support body and internal teeth which are constituted by rotating bodies rotatable with respect to the support body and are formed independently of each other, and wherein the support body of one of the first internal gear and the second internal gear is connected to a stationary side, and the support body of the other thereof is connected to an output side.

2. The planetary gear device according to claim 1, wherein the rotating body comprises a pin member which is supported by the support body, a roller member which is externally fitted to the pin member, and a rolling element which is disposed between the pin member and the roller member.

3. The planetary gear device according to claim 2, wherein the pin member is supported on a radially outer side of the external gears.

4. The planetary gear device according to claim 2, wherein the pin member includes two flanges protruding in a radial direction, and wherein the roller member is disposed between the flanges.

5. The planetary gear device according to claim 2, wherein the rotating body comprises a holder for disposing the rolling elements at a predetermined interval.

6. The planetary gear device according to claim 1, wherein the rotating body comprises a pin member which is supported by the support body and a rolling element which is disposed between the support body and the pin member.

7. The planetary gear device according to claim 6, wherein the pin member is supported on a radially outer side of the external gears and is rotatable with respect to the support body.

8. The planetary gear device according to claim 6, wherein the rotating body comprises a holder for disposing the rolling elements at a predetermined interval.

9. The planetary gear device according to claim 1, wherein at least some of bearings used in the planetary gear device are a seal bearing or a bearing in which thermally solidified grease is disposed between the rolling elements.

10. The planetary gear device according to claim 1, wherein a holding member which holds a lubricant in an exuding manner is provided so as to be in contact with the rotating body.

11. The planetary gear device according to claim 1, wherein each of the first external gear and the second external gear comprises a tooth shape formed in an epitrochoid parallel curve.

12. The planetary gear device according to claim 1, wherein the rotating body rotates around a center axis of the rotating body.

13. The planetary gear device according to claim 12, wherein the rotating body comprises a pin member which is supported by the support body and a roller member which is externally fitted to the pin member, and wherein the roller member rotates around the pin member.

14. The planetary gear device according to claim 12, wherein the rotating member comprises a pin member which is supported by the support body, and wherein the pin member rotates around the center axis.

* * * * *